April 12, 1932.     J. MISCHKER     1,853,134
MEASURING INSTRUMENT
Filed Jan. 27, 1930
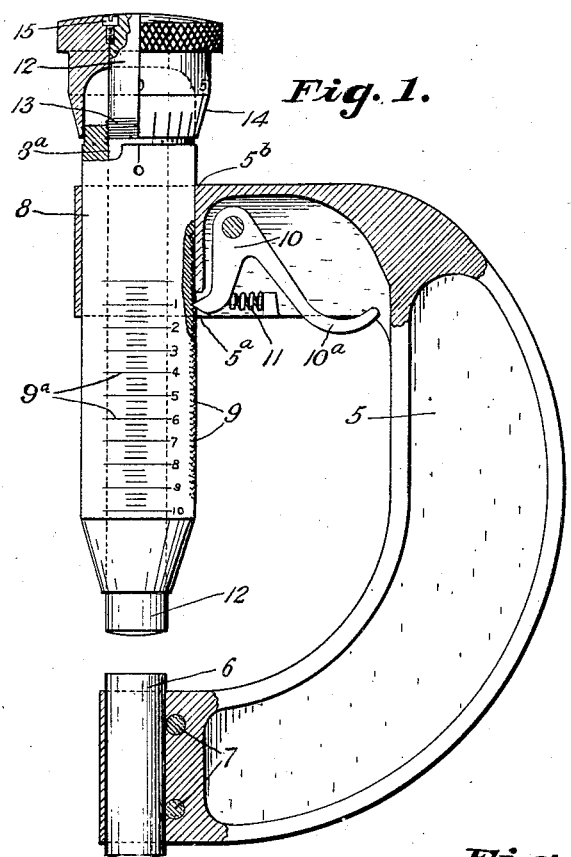
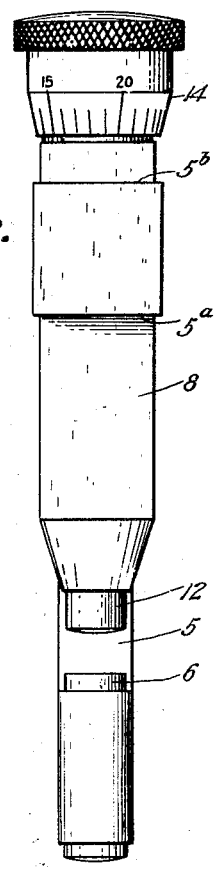
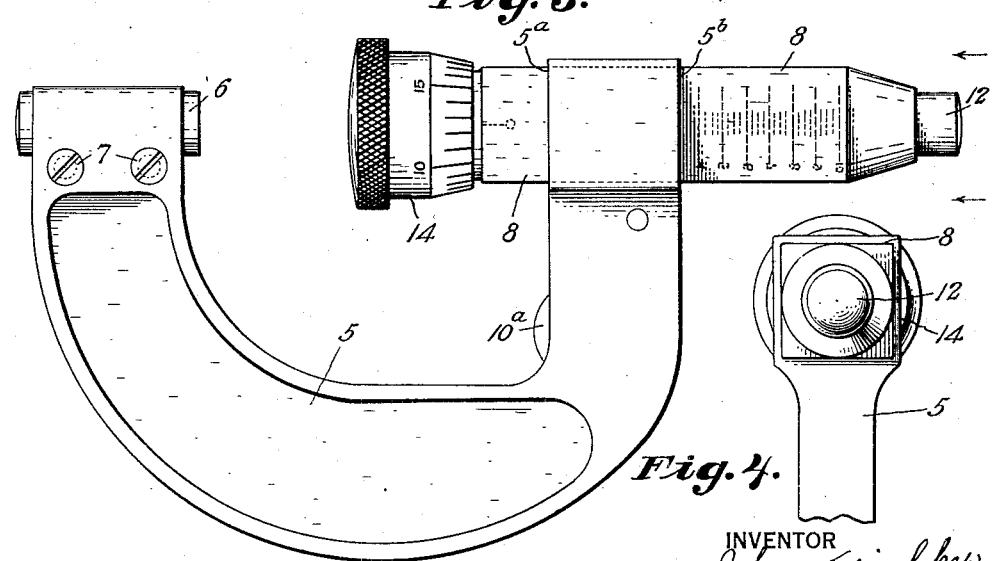
INVENTOR
John Mischker
BY Dowell and Dowell
his ATTORNEYS Patented Apr. 12, 1932

1,853,134

UNITED STATES PATENT OFFICE

JOHN MISCHKER, OF MILWAUKEE, WISCONSIN

MEASURING INSTRUMENT

Application filed January 27, 1930. Serial No. 423,730.

This invention relates to measuring instruments and aims to provide an improved micrometer embodying an adjustable gauge-member operatively interchangeable and reversible in a set of caliper-frames of different sizes for the dual purpose of making one and the same applicable to a widely varied range of measurement and enabling both inside and outside measurements to be taken with any complete unit.

The invention will be best understood by description with reference to the appended drawings illustrating one practical embodiment thereof in a conventional type of micrometer.

In said drawings:

Fig. 1 is a side elevation of the instrument partly in section with the gauge-member in position for taking outside measurements;

Fig. 2 is a front elevation thereof;

Fig. 3 is a side elevation of the instrument with the gauge-member in position for taking inside measurements; and Fig. 4 is an end view looking in the direction of the arrows in Fig. 3.

In the illustrative instrument, a caliper-frame is provided by a conventional U-shaped body 5 of forged steel having strength and rigidity. This represents one of a set of several of the different standard sizes, it being understood that the number of such provided are all alike except as to span or length.

In one arm or end, this frame or body is adapted to receive an anvil-piece 6 in this instance extending transversely through the arm and having one end entirely flattened and its other end slightly beveled or rounded. This anvil-piece being slidably received in the arm of the frame is held frictionally against axial movement by tapered screws 7 binding tensionally thereagainst. A desirable form of screw for this purpose is one in which the head tapers to a straight shank portion which is threaded, so that the head will exert increasing bind against the anvil-piece as it is screwed into its receiving hole.

In its other arm or end the frame receives and holds a gauge-member fitting slidably therein. This gauge-member comprises an outer sleeve or barrel 8 in this instance of rectangular cross-section having a central bore 8$^a$. One side of this sleeve is formed with a series of closely arranged indentations 9 of .025 inch graduation in correspondence with standard or regulation scale markings 9$^a$ applied on another side as shown. These indentations (coordinated with said scale markings as stated) in effect provide a rack of micrometric teeth in which a pawl 10 pivoted within a recess in the arm of the aforesaid frame may engage. This pawl is held in such engagement by a strong expanding spring 11 and has an arm 10$^a$ projecting from its recess like the trigger of a gun for releasive movement by the finger.

The aforesaid sleeve carries a spindle 12 extending through its bore in axial alinement with the aforesaid anvil-piece 6 and with one end projecting therefrom toward said piece for registrative meeting therewith when sufficiently extended. This spindle is rotatively slidable in the sleeve by thread engagement with a portion of the latter, preferably at the upper end, as represented at 13. These threads are very fine or micrometric so as to advance or retract the spindle the extent of only one indentation or quarter-graduation mark on the sleeve in a complete turn therewithin. It is however preferable to extend the thread engagement slightly beyond the intended limits of spindle movement so as to avoid upsetting the threads with rotation in either direction.

On the upper or opposite end of the spindle is applied a cap or thimble 14 affixed thereto by a removable screw-key 15 and having a knurled head facilitating its turn movement of the spindle. This cap is shown closely over-engaging the upper end of the sleeve which for such purpose is formed with an annular neck, thereby concealing and protecting the spindle threads. The cap thus applied limits turn movement of the spindle inwardly of the sleeve by bearing upon the shoulder of the latter. It is shown graduated to .001 inch scale so that one complete turn thereof with the spindle will be equal to .025 of an inch or only one indentation or quarter-mark of the graduations on the sleeve as aforesaid.

The described instrument or unit in the arrangement of Fig. 1 is adapted to the taking of outside or exterior measurements like the ordinary and well known micrometer, where the so-called "barrel" with movable plunger is permanently fixed to the frame or body piece. By depressing the trigger of the pawl to release the gauge-member however, it may be quickly withdrawn and reversed in the frame as shown in Fig. 3, thereby adapting it to the taking of the inside measurements with equal accuracy. In such reversal, the indented or rack side of the sleeve is again presented to the pawl. In the first arrangement, the inside edge $5^a$ of the frame is taken as the zero line, and in the second arrangement the outside edge $5^b$ thereof is taken as the zero line.

It will be appreciated that this form and arrangement of tool enables a very quick adjustment to be made for the taking of any desired measurements, either inside or outside, within the range of a set of caliper frames, since the gauge-member is interchangeably and reversibly usable in any frame of the set and only one of such is therefore required for each set. This makes possible a substantial reduction in the cost of the ordinary micrometer set, where each of the frames carries and requires its own gauge-member permanently affixed thereto. Apart from the greater convenience and lesser cost, the bulk and weight of a set is much reduced and uniformity of measurement is assured. The novelty and importance of the invention in providing such a desirable and important form of tool will be apparent.

As therebefore various forms of instruments with modifications and changes in the relation and assembly of the parts may obviously be made within the scope of the invention, it will be understood that the appended claims are not intended to limit the same to the specific form and construction shown.

Having thus described my invention, what I claim as new and desire to secure by Letters Patent of the United States is:—

1. In a micrometer, an adjustable gauge-member interchangeably applicable to and reversible in caliper frames of different sizes for taking both inside and outside measurements of objects of widely diversified proportions; said gauge-member comprising a sleeve adapted to be slidably fitted in guide openings in the frames and having a longitudinal series of micrometrically spaced indentations with coordinated standard scale graduations on the outer side thereof providing a rack engageable by spring-pressed and trigger-released pawls on the respective frames for adjustably and releasably holding it to measuring position therein, a spindle extending slidably through said sleeve and having thread engagement with a portion thereof by which to be rotatively advanced or retracted the extent of only one indentation or quarter graduation mark of the sleeve in a complete turn, and a cap on one end of said spindle for turning the same in the sleeve and having graduations thereon subordinate to the graduations of the sleeve for determining fractional extents of spindle movement in opposite directions.

2. In a micrometer, a gauge-member adapted to be removably and reversibly fitted to caliper-frames of different size; said member comprising a sleeve slidably received in the frames and having a series of closely arranged indentations in one side related to standard scale graduations thereon and providing a rack engageable by spring-pressed pawls on the frames for holding it releasably to set position therein, a spindle extending slidably through said sleeve and having thread engagement with a portion thereof by which it may be rotatively advanced or retracted the extent of only one indentation or quarter-graduation on the sleeve in a complete turn, and a cap on one end of said spindle for turning the same in the sleeve; said cap being graduated subordinately to the graduations of the sleeve and limiting the turn-movement of the spindle inwardly thereof.

3. In a micrometer, a caliper frame having an anvil-piece reversibly adjustable in one end and a slide-way opening with adjacent spring-pressed pawl in the other, and a gauge-member slidably fitted reversibly in said opening in axial alinement with the anvil-piece; said member comprising a sleeve having a longitudinal series of closely spaced indentations corresponding to standard micrometric scale markings on its outer side providing a rack engageable by said pawl on the frame for releasably holding it to set positions therein, a spindle extending through and threadably engaged with said sleeve for axial movement therein with rotation in opposite directions and a graduated cap for actuating said spindle in the sleeve; a single rotation of the spindle advancing or retarding the same the extent of only one of the indentations on the sleeve.

4. In a micrometer, a gauge-member adapted to be reversibly and interchangeably fitted in caliper frames of different sizes; said member comprising a sleeve slidably receivable in the frames and having a longitudinal series of micrometrically spaced indentations in one side corresponding to standard scale graduations on another and providing a rack engageable by spring-pressed pawls on the respective frames for releasably holding it to set measuring positions therein, a spindle extending slidably through said sleeve and having thread engagement with a portion thereof by which to be rotatably advanced or retarded the extent of only one indentation or scale mark on the sleeve in one complete turn, and a cap on one end of said spindle for turning the same in the sleeve and having graduations thereon subordinate to the graduations of the sleeve for determining fractional extents of spindle movement in opposite directions; together with a caliper frame having an anvil-piece reversible in one end and means in the other for receiving the gauge-member in axial alinement therewith.

5. A micrometer comprising a caliper frame having an anvil-piece in one end and an adjustable gauge-member held by a releasable spring-pressed pawl in the other end; said anvil-piece and said gauge-member both being reversibly and slidably adjustable in said frame, and said gauge-member embodying a non-rotative sleeve having a scaled longitudinal rack-portion formed by indentations spaced at micrometric distances apart thereon and engageable by said pawl on the frame, a spindle extending through said sleeve with a portion in threaded engagement therewith for limited projective and retractive movement by screw-action, and a head-cap on one end of the spindle for turning the same; said cap being extended over a portion of the sleeve and graduated with respect to a zero marking thereon for indicating fractional extents of spindle movement within the spacing distance between the indentations on said sleeve.

6. In a micrometer, an adjustable gauge-member removable from and reversible in a caliper frame for interchangeable application to frames of different sizes and for taking both inside and outside measurements of objects of widely different proportions; said member comprising a sleeve adapted to be non-rotatably fitted in one end of a frame and having thereon a scaled longitudinal rack-portion provided by indentations spaced at micrometric distances apart and engageable by a releasable spring-pressed pawl on the frame, a spindle extending through said sleeve with a portion in threaded engagement therewith for projective and retractive movement by screw action, and a head cap on one end of the spindle for turning the same; said cap being engaged over a portion of the sleeve in opposition to a shoulder thereon limiting the turning movement in one direction and graduated with respect to a zero marking on the sleeve for indicating fractional extents of spindle movement therewithin between limits of the spacing between the indentations on the sleeve.

7. In a micrometer, an adjustable gauge-member removable from and reversible in a caliper frame for interchangeable application to frames of different sizes and for taking both inside and outside measurements of objects of widely different proportions; said member comprising a sleeve adapted to be non-rotatably fitted in one end of a frame and having thereon a scaled longitudinal rack-portion provided by indentations spaced at micrometric distances apart and engageable by a releasable spring-pressed pawl on the frame, a spindle extending through said sleeve with a portion in threaded engagement therewith for limited screw-action projecting and retracting the same the extent of only one spacing between the indentations on the sleeve in a single complete turn, and a head cap on one end of the spindle for turning the same; said cap being engaged over a portion of the sleeve in opposition to a shoulder thereon limiting the movement in one direction, and graduated with respect to a zero marking on the sleeve for indicating the extent of spindle movement therewithin.

In testimony whereof I affix my signature.

JOHN MISCHKER.